United States Patent [19]
Fleck et al.

[11] Patent Number: 5,587,559
[45] Date of Patent: Dec. 24, 1996

[54] CONTROL METHOD OF A PLURALITY OF LOCATORS AND CONTROL DEVICE OF SAME

[75] Inventors: David C. Fleck, Vancouver, Wash.; Yoichi Tsuchida, Saitama, Japan

[73] Assignee: Wacom Co., Ltd., Saitama, Japan

[21] Appl. No.: 352,133

[22] Filed: Dec. 1, 1994

[30]   Foreign Application Priority Data

Nov. 18, 1994   [JP]   Japan .................................. 6-309757

[51] Int. Cl.$^6$ .................................................. G08C 21/00
[52] U.S. Cl. ................................................ 178/18; 178/19
[58] Field of Search ..................... 178/18, 19; 345/156, 345/173, 174; 395/200.11, 200.13, 200.08, 700.16, 821, 856; 264/709.16, 709.11

[56]   References Cited

U.S. PATENT DOCUMENTS 5,239,373   8/1993   Tang et al. .............................. 178/18
5,389,745   2/1995   Sakamoto .................................. 178/18
5,389,951   2/1995   Baker ........................................ 178/18
5,402,151   3/1995   Duwaer ..................................... 178/18

*Primary Examiner*—Wellington Chin
*Assistant Examiner*—Paul Loomis
*Attorney, Agent, or Firm*—Lowe, Price, LeBlanc & Becker

[57]                ABSTRACT

A control method and device allows a plurality of locators to be utilized in commonly used systems which have been inherently designed to be equipped with a single locator. The locator represents tablet, and pointing device such as mouse, pen. This control method stores device information table, pointer for the table, current status information on each one of plural locators, retrieves required information table by using the pointer and current status information in response to event generation of any one of the locators, request from application program, or predetermined period, and refers to the content of the information table.

10 Claims, 11 Drawing Sheets

Prior Art

CONTROL METHOD OF A PLURALITY OF LOCATORS AND CONTROL DEVICE OF SAME

BACKGROUND OF THE INVENTION

1. Field of the Invention

The present invention relates generally to an operation and control method for various information from an input device associated with a computer system. Furthermore, the present invention relates to an improved control method allowing a plurality of locators to be utilized in commonly used systems which have been inherently designed to be equipped with a single locator. More specifically, the present invention provides an improved control method and device for effectively performing various operations of a computer through a plurality of locators such as mouse, tablet, digitizer, pen, and the like.

2. Description of the Prior Art

In this specification, to easily understand the present invention without any confusions, the terminology "locator" represents a location input device such as a pointing device and a tablet (digitizer). More detail, "pointing device" represents a single pointing device such as a mouse and a pen for pointing a single position (or a single coordinate position), and "tablet or digitizer" represents a specific device composed of such pointing device and a position detecting plate. It is commonly understood that "tablet" is relatively compact rather than "digitizer". According to these definitions, a single tablet may be equipped with one or more pointing devices.

Conventionally, in a computer equipped with a locator such as a tablet or a pointing device (a pen or a mouse), when an operator performs input operation through this locator, this computer requires a specific software to interface the input signal from the locator into a regular information signal belonging to a main operating system of the computer. Thus the operating system operates the input signal to transmit to its application program or to display the input information through a display device associated with the computer. This software to interface the input signal from the locator is generally called "device driver".

A single pointing device, for example a specific type of mouse, requires its exclusive device driver, but an all-round type interface adapted for any types has not yet provided. In order to overcome the above described demerit, an operating system may be additionally provided with a sub-operating system for such interface operation. This sub-operating system is typically activated by API (Application Program Interface) which operates as a function call from an application to an operating system to perform various operations such as initialization of mouse, reading operation of mouse position and control operation of mouse. This operating system includes another sub-operating system to support various operations of a key-board which is an ordinary input device associated with a commonly used computer system. Adaptability and extendibility of this conventional computer for any applications depends on capability and combination of these sub-operating systems.

Anyway, these conventional systems have been adapted for only one pointing device, particularly, a single mouse. Thus it is required to convert the information input from a tablet (or a pen attached to this tablet) into corresponding mouse-generated information through a tablet device driver (hereinafter, referred to "tablet driver") to supply the converted information to the operating system and then to the current application program.

As discussed above, conventional operating system and application program have been designed to be adapted for only single pointing device or tablet, not for multiple pointing devices and tablets. On the other hand, in recently used personal computer systems, both software and hardware have been modified to be adapted for multi task processing. For example, a plurality of application programs are simultaneously activated and frequently switched among them, and their data can be interchanged as necessary. According to this tendency, some multi-tasking interfaces such as graphical user interface have been also developed and improved. Many conventional computer systems adapted for a single input device can not satisfy user's demand.

For example, in the case of operating a plurality of application programs such as CAD (Computer Aided Design) in response to respective tablet-input signals, a single tablet associated with a conventional computer system is served for two or more application programs and must be also manually switched to transmit the tablet-input signal to another application program on the same occasion of switching the current application program to another. Every switching operation always requires to initialize and reset the tablet itself. Furthermore, in the case of this single tablet being not commonly applied to plural application programs, this tablet must be replaced by another whenever the current application program is switched to another.

On the other hand, even when a single application program is adapted to plural tablets, many conventional computer systems can not respond the multi task processing request from this single application program. Therefore, such conventional computer system can provide only information from a single tablet even when this single application program requests respective information from plural tablets. Many conventional computer systems are not equipped with means for selecting a required one from plural tablets. In order to overcome the above described demerits, it is necessary to drastically change the whole operating system ready set in the computer for a new system. This will result in high cost and complicated works.

BRIEF SUMMARY OF THE INVENTION

It is therefore an object of the present invention to provide an improved control method allowing a plurality of pointing devices or tablets to be utilized in commonly used operating and application systems which have been inherently designed to be equipped with a single pointing device.

Another object of the present invention is to provide an improved control method for effectively controlling various operations of a computer through a plurality of tablets or pointing devices such as mouse, pen, and the like.

An additional object of the present invention is to provide an improved control method for selecting and transmitting required information from plural pointing devices or tablets to operating system and/or application program.

A further object of the present invention is to provide an improved control method for selectively displaying required pointed information on a display device.

Still another object of the present invention is to provide a control device for realizing the above described objects.

To accomplish the above described objects, a control method according to the present invention is characterized by the following compositions. (1) In a data processing system including a hardware and its operating system which process only information input through a single pointing device, a control method for utilizing a plurality of pointing devices comprising;

a first storing step for storing stationary information, independent of time, on each one of the plural pointing devices and individual device information on each one of the pointing devices, containing current sampling data which is rewritten depending on every sampling operation of the pointing device, as the individual item corresponding to the pointing device in an individual device information table;

a second storing step for storing a table pointer to identify the stored position of the individual device information on each one of the pointing devices in the individual device information table;

a third storing step for storing the whole number of pointing devices and device status information representing current state of each one of the pointing devices;

a retrieval step for retrieving the required device information table by using the device status information and the table pointer, in response to event generated in any one of the plural pointing devices, or any request from the application, or at every predetermined period;

a control step for controlling the device information table to refer the content of the required device information table;

an ordinary data transmit step for sequentially transmitting sampling information representing coordinates and so on supplied from one of the plural pointing devices, as a mouse information to the operating system in time sharing manner;

a selecting step for selecting one of the plural pointing devices in response to the event generated; and a final data transmit step for transmitting only information from the selected pointing device as the currently required mouse information to the operating system. (2) The control method in the data processing system according to the above (1) further comprising;

an additional table forming step for forming a stroke record information table in which the record of stroke information currently generated and previously generated for a predetermined numbers, one stroke information being represented by a set of sampling data sequence during ON-keeping state of a switch associated with the pointing device which has one or more switches, when at least one of the plural pointing devices is mounted on the tablet;

a fourth storing step for storing a current stroke data pointer which indicates the stored position of the first data of the current stroke information stored as the above mentioned record of stroke information, and the number of sampling data included in each current stroke information; and a retrieval and reference step for retrieving and referring to the above mentioned stroke record information table as required. (3) The control method in the data processing system according to the above (1) or (2), wherein the switch assembled on the pointing device is associated with a keyboard input, and thus an ON-signal from the keyboard input associated switch is transmitted, independent of the data transmitting operation for transmitting the mouse information from the plural pointing devices, to the above operating system. (4) In a data processing system including a hardware and its operating system which process only information input through a single tablet, a control method for utilizing a plurality of tablets comprising;

a first storing step for storing stationary information, independent of time, on each one of the plural tablets and individual device information on each one of the tablets, containing current sampling data which is rewritten depending on every sampling operation of the pointing device, as the individual item corresponding to the tablet in an individual device information table;

a second storing step for storing a table pointer to identify the stored position of the individual device information on each one of the tablets in the individual device information table;

a third storing step for storing the whole number of tablets and device status information representing current state of each one of the tablets;

a retrieval step for retrieving the required device information table by using the device status information and the table pointer, in response to event generated in any one of the plural tablets, or any request from the application associated with this operating system, or at every predetermined period;

a control step for controlling the device information table to refer the content of the required device information table;

an ordinary data transmit step for sequentially transmitting sampling information representing coordinates and so on supplied from one of the plural tablets, as a mouse information to the operating system in time sharing manner;

a selecting step for selecting one of the plural tablets in response to the event generated; and a final data transmit step for transmitting only information from the selected tablet as the currently required mouse information to the operating system. (5) A tablet interfacing method for converting coordinate information and switching information from plural tablets each of which has at least one of pointing device into any suitable forms adapted for an operating system, and supplying the converted information to this operating system, the method comprising;

a conversion-table forming step for forming a conversion-table which is converted whenever the switch information from each of the whole switches assembled on the plural tablets is associated with a mouse event or keyboard input;

a decision step for deciding whether the switch information on each one of the whole switches of the plural tablets is ON or OFF; and a transmit step for transmitting sequentially the coordinate data from each one of the plural tablets to the operating system in a time sharing manner when all of the switch information are OFF, or the converted information through the conversion-table as the information from the mouse event or the keyboard input to the operating system when any one of the switch information is ON.

According to another aspect of the present invention, in a data processing system including a hardware and its operating system which process only information input through a single pointing device, a control device for utilizing a plurality of pointing devices comprises;

a first storing means for storing stationary information, independent of time, on each one of the plural pointing devices and individual device information on each one of the pointing devices, containing current sampling data which is rewritten depending on every sampling operation of the pointing device, as the individual item corresponding to the pointing device in an individual device information table;

a second storing means for storing a table pointer to identify the stored position of the individual device information on each one of the pointing devices in the individual device information table;

a third storing means for storing the whole number of pointing devices and device status information representing current state of each one of the pointing devices;

a retrieval means for retrieving the required device information table by using the device status information and the table pointer, in response to event generated in any one of the plural pointing devices, or any request from the application program associated with this operating system, or at every predetermined period;

a control means for controlling the device information table to refer the content of the required device information table;

an ordinary data transmitting means for sequentially transmitting sampling information representing coordinates and so on supplied from one of the plural pointing devices, as a mouse information to the operating system in time sharing manner;

a selecting means for selecting one of the plural pointing devices in response to the event generated; and a final data transmitting means for transmitting only information from the selected pointing device as the currently required mouse information to the operating system.

The control device as the above may further includes an additional table forming means for forming a stroke record information table in which the record of stroke information currently generated and previously generated for a predetermined numbers, one stroke information being represented by a set of sampling data sequence during ON-keeping state of a switch associated with a pointing device which has one or more switches and mounted on a tablet, when the pointing device is at least one of the plural pointing devices;

a fourth storing means for storing a current stroke data pointer which indicates the stored position of the first data of the current stroke information stored as the above mentioned record of stroke information, and the number of sampling data included in each current stroke information; and a retrieval and reference means for retrieving and referring to the above mentioned stroke record information table as required.

The control device for plural pointing devices may be also applied to plural tablets.

According to the control method and device as defined above, since they include individual device information tables to store and control both stationary and kinetic information on plural pointing devices or tablets, and additional individual tables to store and control record information as required, the application program associated with this operating system can selectively operate the plural pointing devices or tablets by changing the processing procedure to refer these individual device information tables in accordance with the occurrence of various conditions.

Through the control method according to the present invention, conventionally used operating systems without any modifications can directly utilize plural pointing devices or tablets by effectively and currently selecting only information from one of these plural pointing devices or tablets.

Other features and advantages of the invention will be apparent from the following description taken in connection with the accompanying drawings.

DETAILED DESCRIPTION OF THE PREFERRED EMBODIMENT

The present invention will be understood by discussing on some preferred embodiments in conjunction with the accompanying drawings.

Figure 1:
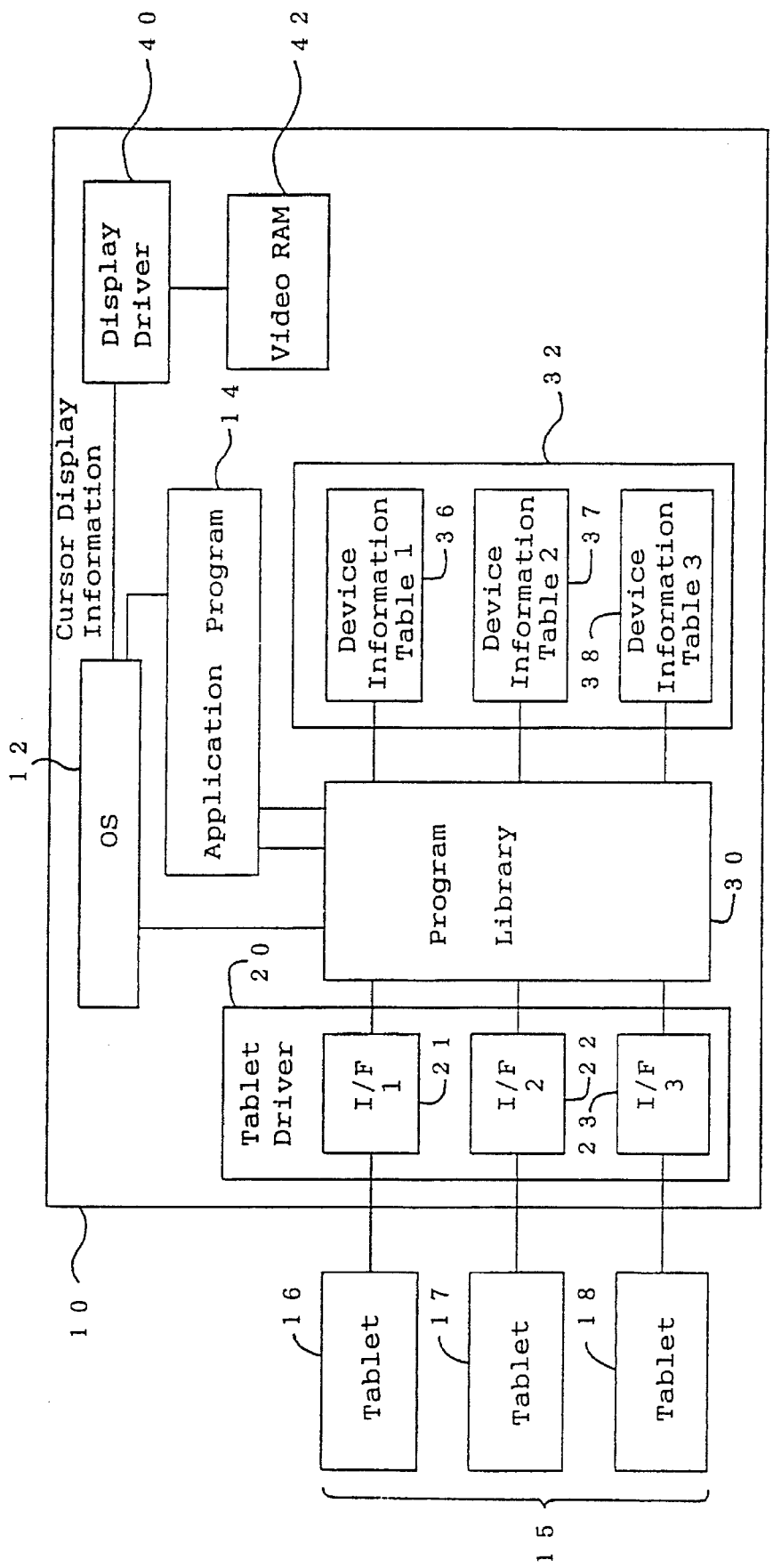
FIG. 1 is a block diagram which shows one example of functional relationship in the data processing system associated with a plurality of tablets according to the first embodiment of the present invention.

FIG. 1 is a block diagram which shows one example of functional relationship in a data processing system 10 associated with a plurality of pointing devices or tablets according to the first embodiment of the present invention.

The data processing system 10 represents a commonly used personal type computer or workstation which includes CPU, bus, various memories, and so on, not shown. A system memory of this data processing system 10 is stored with some necessary software such as resident or non-resident operating system 12, device driver 20, application program 14. CPU will perform required program to realize these functions as demand. A part of the processed content by this application program 14 is displayed by a display unit, not shown, through a display driver 40 and a video RAM 42.

This data processing system 10 is further connected to a peripheral device such as a locator unit 15. In this embodiment, three tablets 16, 17 and 18 are connected to this data processing system 10. The present invention is not limited to this case, but can be applied to more complicated cases, for example, combination between some tablets and mouse and/or pen. Each one of the tablets also may have two or more pointing devices such as pen, cursor, and so on.

In the case of each one of the tablets having two or more pointing devices, signals from these pointing devices are treated as a signal from a single pointing device for convenience. In detail, while all of the pointing devices generate only ordinary information signals representing position; i.e., coordinates, the information signals from these pointing devices are switched in response to order of generation so that the information signals are supplied to a display unit in time sharing manner to display a cursor position on the display unit in such order, or sequently supplied to the operating system or current application.

When a switching signal is generated by turning on any one of switch of the pointing devices, only information from the turned on pointing device is allowed to be flowed for a predetermined period. This operation can be performed through a tablet driver.

Typically, this tablet driver is provided with a function which provisionally decides that the plural tablets each have a pointing device and therefore information is generated by only one pointing device. This operation through the tablet driver will be described in detail with reference to FIG. 4.

The pointing device is generally equipped with plural switches to adapt various input operations by user.

Referring to FIG. 1, the concept of the present invention is essentially achieved by functions of a tablet driver 20, a program library 30, and a storage unit 32. This storage unit 32 includes a plurality of device information tables 36, 37 and 38. 38. The function of these device information tables will be described in detail with reference to FIG. 2, later.

As an example, the tablet driver 20 will serve as an integrated tablet driver which has an interface function for performing the same operation to each one of the tablets 16, 17 and 18 as a conventional single tablet. Thus, the tablet driver 20 has at least function to convert the input information from the tablets into any suitable form operable by the operating system; for example, mouse information form, and supply the converted information to the operating system.

Further, this data processing system 10 includes a connection unit, not shown, containing plural input ports through which the tablets 16, 17 and 18 are electrically connected to the computer of this system 10. The tablet driver 20 also controls these input ports.

The program library 30 is essentially composed of a plurality of control programs to realize the operation of the plural tablets.

Although FIG. 1 shows that the control operation respect to the tablets 16, 17 and 18 is performed by two sets of software; i.e., the tablet driver 20 and the program library, the present invention is not limited to these two sets of software. In other words, the required functions performed by these two sets of software may be included in a single software or combined with another software. For example, the program library 30 may serve as a subsystem combined with the operating system so that the program library 30 is called by API. Alternatively, it may serve as a single independent application program, or may be combined with an actually used application program. Of course, all functions may be included in the tablet driver 20.

The tablet driver 20 and the program library 30 each have basic functions as disclosed below.

Firstly, at the stage for initializing the data processing system 10, the tablet driver 20 confirms the state of the plural input ports, and detects the number and type of the input devices connected to the data processing system 10. Then the tablet driver 20 forms an individual device information table (36, 37 or 38 in FIG. 1) for each input device. When the input device is a tablet which has only a single pointing device, the device information stored in the device information table represents the tablet information. On the other hand, when the tablets each have plural pointing devices, the whole information respective to each pointing device corresponds to the device information to clarify that the pointing device belongs to which tablet. The tablet driver 20 stores actual information to the formed tables.

Figure 2:
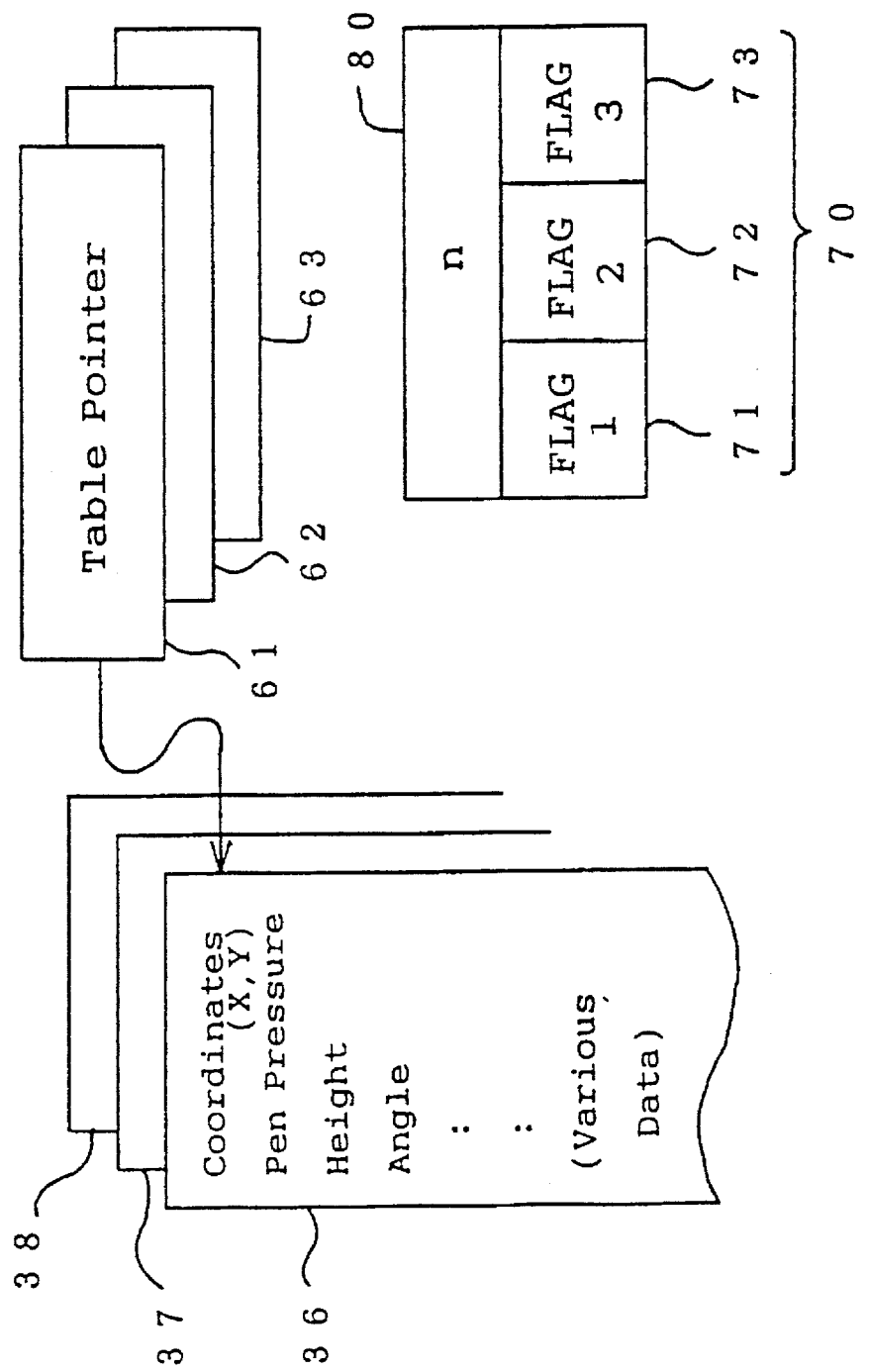
FIG. 2 is a schematic illustration which shows one example of device information tables, corresponding data table pointers, and another information storage for storing related information such as device state flags and the whole number of devices.

FIG. 2 shows the device information tables 36, 37 and 38 in the storage unit 32 and table pointers 61, 62, and 63 to control corresponding tables, respectively. Further, there is shown another information storage in which related information such as a device state flag 70 and the whole number of devices are stored.

Individual device information related to each tablet stored in the device information table 36 (37, 38) includes stationary information depending on factors belonging to individual device and kinetic information depending on time. In an example of tablet, the stationary information includes tablet identification number, type of tablet, the number of switches assembled on each pointing device, switch function, type of compatible pointing device, coefficient for converting data from each tablet (for example, scale factor), pen pressure range, type of tablet mode, and so on. They are previously determined and thus substantially independent of time. The kinetic information includes coordinates (X, Y), pen pressure, height, angle, current tablet mode, and so on. They are updated at each sampling period of tablet.

The table pointers 61, 62 and 63 point stored position in the corresponding information tables, respectively. Each pointer stores information representing the address of the first data stored in the information table and size of the information table. This pointer facilitates retrieval and reference operations on the device information table.

This embodiment comprises another information storage for controlling plural input devices. Such information includes a device state flag 70 which is composed of plural flags 71, 72 and 73 related to respective tablets (pointing devices when each tablet has plural pointing devices). The flag represents current state of each tablet such as generation of event. Also the whole number "n" of tablets connected to this data processing system is stored.

The plural tablets can be easily controlled owing to the combination between the device information tables 36, 37 and 38 and the corresponding table pointers 61, 62 and 63. When each tablet has two or more pointing devices, the same control will be performed by forming the device information table for each pointing device.

The scale factor of the stationary information will be used for converting the data from the tablet into any convenient form for the current application program or user. For example, the scale factor required by the user is previously recorded to convert coordinate data from the tablet through this recorded scale factor. Alternatively, some suitable conversion factors are also previously recorded to make the relationship between the position on the display screen and that of absolute coordinate system on the tablet. This conversion system ensures any required conversions by the current application program or another library, or direct use of non-converted data from the tablet. Such information may be set with the table pointers 61, 62 and 63 rather than in the device information tables to increase efficiency in some operations.

Figure 3:
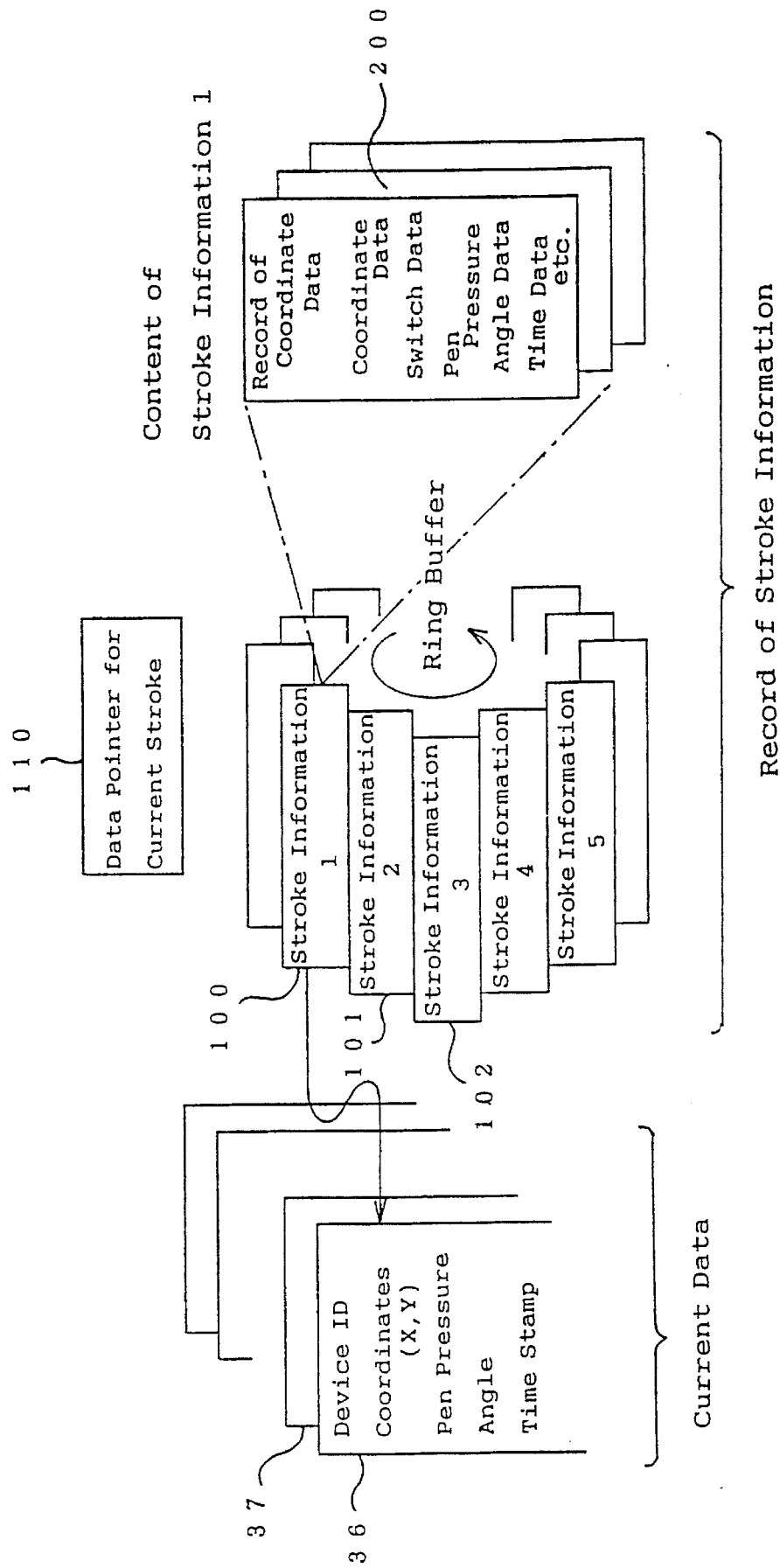
FIG. 3 is a schematic illustration which shows another example of device information table containing stroke record information according to another embodiment of information control for data processing system connected to plural tablets.

FIG. 3 shows another embodiment of information control for data processing system connected to plural tablets. Each tablet has two or more pointing devices. FIG. 3 shows a single tablet (or its one pointing device) and the record of its stroke information to avoid confusion. There is shown a storage to store a series of stroke information as the record of stroke information of the device (pointing device) in addition to the device information table shown in FIG. 2. One stroke information represents one data sequence generated by sampling during ON-continued state of the switch of the pointing device. When a pen is used for the pointing device, a dash of the pen corresponds to one stroke information. The detailed content of the current stroke information 100 is shown in an enlarged form 200. As disclosed above, one stroke information includes a set of data generated at each sampling time. Each sampling includes data relating to coordinates (X,Y), pen pressure, angle, time, and so on.

Furthermore, there is shown a plurality of information area 101, 102, . . . for storing some sets of past stroke information. They have also the same content as shown in 200. The stroke information from the current information 100 to the past information are sequently stored in a ring buffer, as an example, in a time series manner so that the oldest will be deleted whenever the current information is updated according to FIFO method.

FIG. 3 shows a data pointer 110 for pointing the stored position of the first data in the current stroke information. This data pointer also represents the size of the stroke information; i.e., the number of data. Thus the record of stroke information will be easily retrieved and referred as required.

The record of stroke information shown in FIG. 3 is formed for each tablet. This stroke information control system may also apply to each pointing device when each tablet has two or more pointing devices.

A typical operation of the data processing system for plural tablets according to the present invention will be described in detail.

As disclosed above, conventional systems have been adapted for a single mouse, and therefore the input information from the tablet has to be converted into a mouse Generated information signal and transmitted to the operating system or associated application program. This conversion function belongs to a conventional tablet driver.

Figure 4:
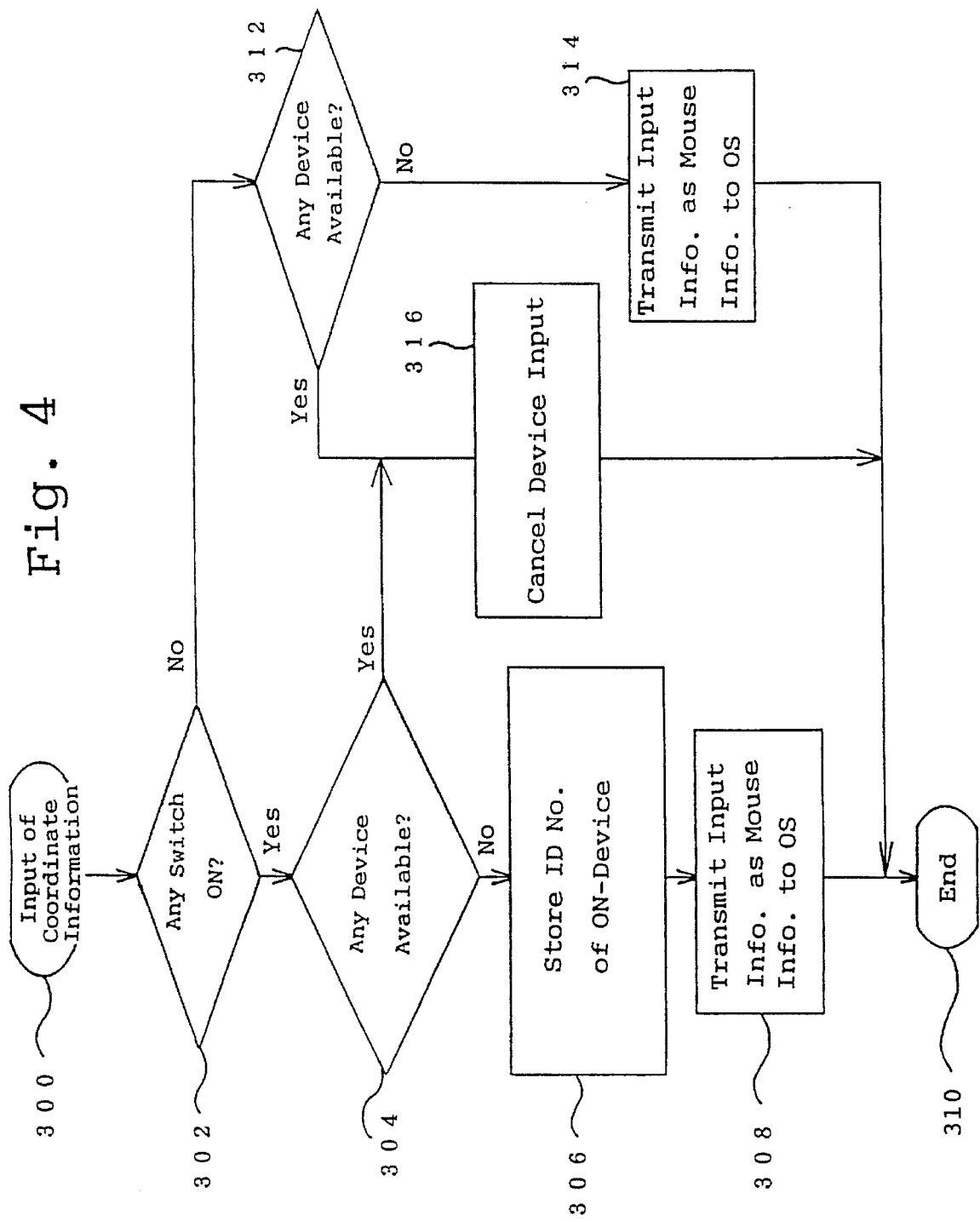
FIG. 4 is a logical flow chart which shows a processing program for input information from the tablet driver according to the present invention.

The tablet driver 20, in FIG. 1, according to the present invention basically executes one of exclusive controls to transmit smoothly and effectively the input from plural tablets to a already installed operating system. FIG. 4 shows a logical flow chart of processing program for input information from the tablet driver according to the present invention. The program shown in FIG. 4 executes an exclusive control to make the input from the pointing device switched ON available. At a block 300, one pointing device generates an input signal relating to coordinate information for each predetermined sampling period. At a decision block 302, this program decides whether any switch of any pointing device is turned on or not. If answer is Yes, then the program progresses to a decision block 304 where the program is executed to decide whether any available pointing device has been already existed or not. If answer is Yes, then the program progresses to a block 316 where the input will be cancelled. This program routine ends at a block 310. If answer of the decision block 304 is No, then the program progresses to a block 306 where the identification number of the switched On pointing device is stored in the flag 70 shown in FIG. 2. Then at a block 308, the information from the On-pointing device, as a mouse information, is transmitted to the operating system. Finally this program routine for one sampling period ends at a block 310.

If the answer of the decision block 302 is No, then the program progresses to a decision block 312 where the program is executed to decide whether any available pointing device has been already existed or not. If answer is Yes, then the program progresses to the block 316 where the input will be cancelled. This program routine ends at the block 310. If the answer of the block 312 is No, then the program progresses to a block 314 where this input information is transmitted to the operating system as a mouse information. Finally this program routine for one sampling period ends at the block 310.

In this embodiment, the coordinate information at the block 300 is sequentially input by switching the plural pointing devices in regular order. When neither pointing devices are turned on; i.e., the pointing device is simply moved on the tablet, the coordinate information from the plural pointing devices are sequentially transmitted to the operating system. This operating system also outputs the coordinate information to the associated display unit to display a cursor representing the current position of the pointing device on the display screen. When this cursor is sequentially displayed at a high speed in response to the input information from the pointing devices, user may feel these plural pointing devices are displayed on the same screen on the same occasion owing to afterimage effect of the screen. If any one of the switches is turned on, then only the pointing device whose switch is turned on is displayed on the screen through the above described program. According to this manner, this user can obtain a multi-device processing system for controlling a plurality of input devices in its appearance and operating manner.

In addition to the control program shown in FIG. 4 to execute an exclusive control for making the pointing device whose switch is turned on available, another control factor to select only one device as available may be applied. For example, such control may depend on the moved distance of the pointing device. Alternatively, a predetermined pointing device is activated whenever a specific switch is turned on. Furthermore, in another example, such exclusive control may be executed in response to another information from the external unit such the associated application program.

Figure 5:
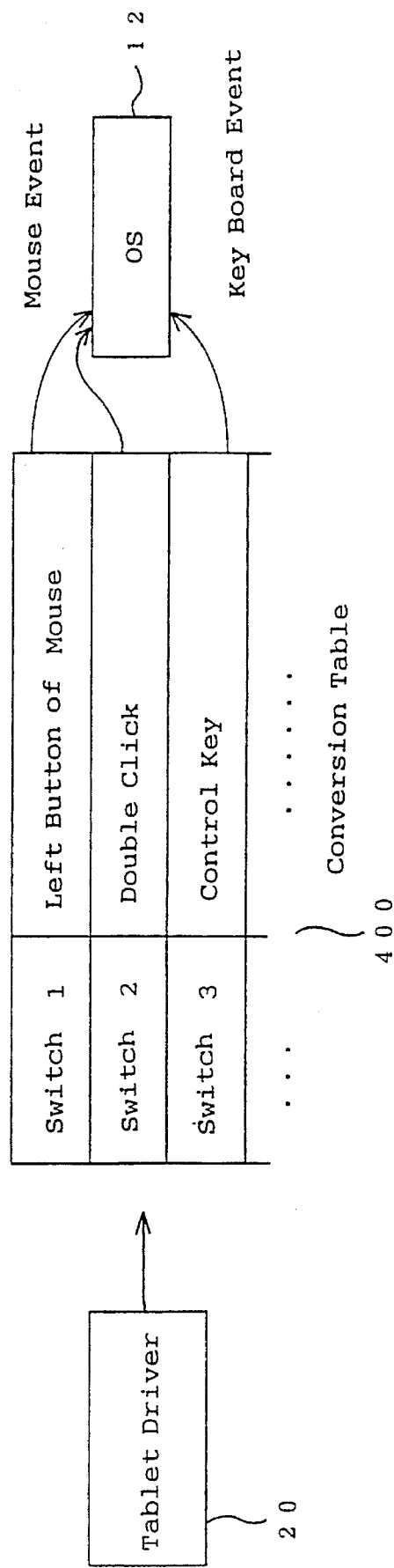
FIG. 5 is a schematic illustration which shows another function of the tablet driver according to the present invention.

FIG. 5 shows another function of the tablet driver 20 according to the present invention. As described above, the tablet driver 20 transmits the pointing device information as a mouse information to the operating system 12. In FIG. 5, there is shown a conversion table 400 through which the pointing device information is converted and transmitted to the operating system 12. In a conventional manner, switch 1 and switch 2 correspond to mouse information such as left button operation and double click operation, respectively. Accordingly, such conventional system has a single route capable of transmitting the mouse information from the tablet driver to the operating system, so that the exclusive control as shown in FIG. 4 is required to such conventional manner having a single route.

On the other hand, in the control method according to the present invention, a switch 3 of the conversion table 400 in FIG. 5 may be associated with keyboard information such as a control key signal. A keyboard commonly used in conventional system has an independent device driver capable of input operation independent of the mouse. Therefore, when the switch 3 of the pointing device is associated with the key board information, the information from the tablet driver will be transmitted to the operating system through the keyboard route independent of the mouse route. In other words, the switch 3 associated with the keyboard information does not need the exclusive control as shown in FIG. 4.

The conversion table 400 shown in FIG. 5 can realize flexible setting and changing various operating conditions.

For example, some switches of the plural pointing devices may be associated with the mouse route to perform the inherent switching function belonging to the tablet, while the remaining switch(es) may be associated with the keyboard route to perform another function independent of the tablet or mouse. This flexibility contributes to the improvement in operation utility. For example, it is possible to generate any required keyboard event in response to the switching action of the switch mounted on the pointing device without the keyboard.

Figure 6:
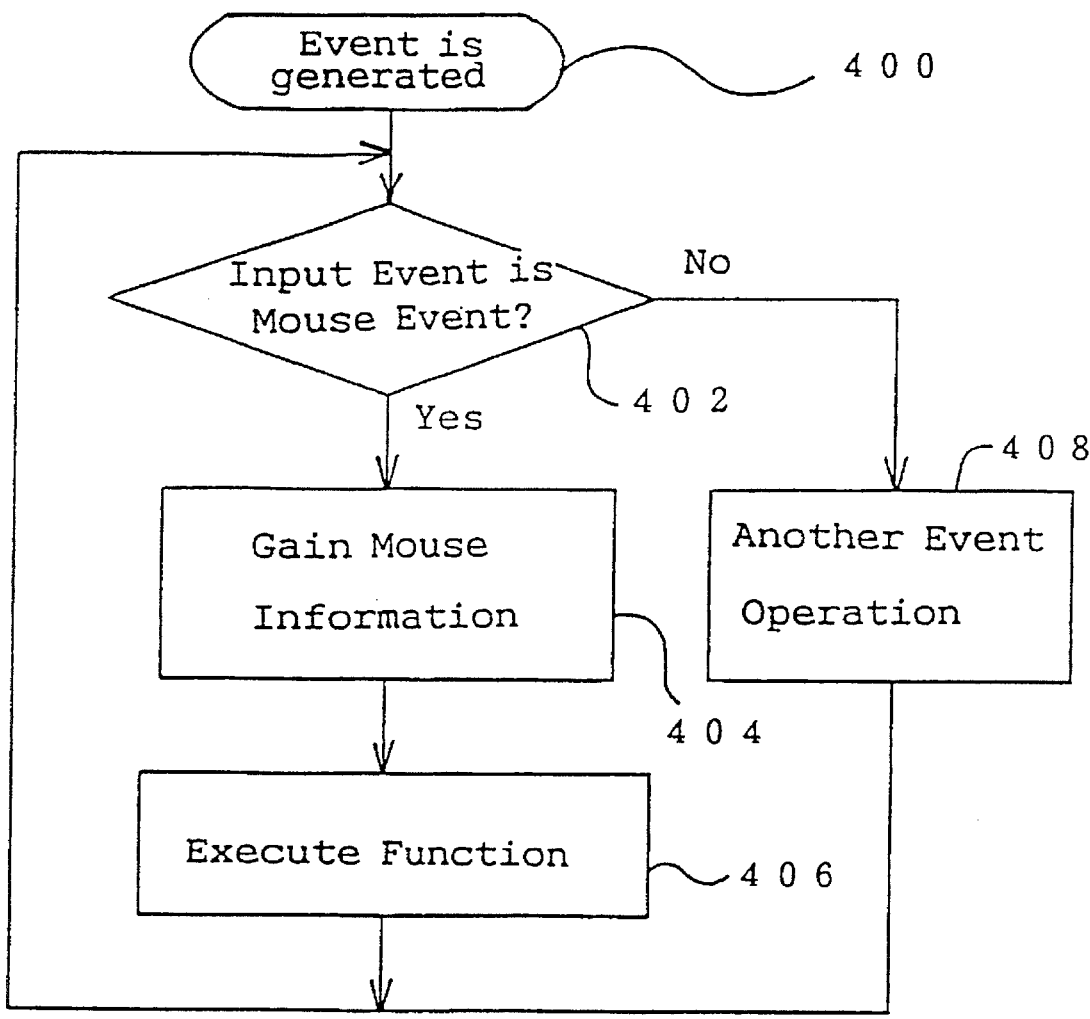
FIG. 6 is a flow chart for processing mouse information through a typical application program in prior art.

FIG. 6 shows a flow chart for processing mouse information through a typical application program in prior art. Each mouse information is transmitted from the tablet driver to this application program through the operating system. At a block 400, one event is generated. At a decision block 402, the application program decides whether the input event is a mouse event or not. If answer is Yes, then the mouse information is gained at a block 404. Nextly, at a block 406, the function represented by the gained mouse information is executed. After the block 406, the processing program is returned to the decision block 402 to repeat this routine. If the answer of the decision block 402 is No, then another event is executed at a block 408.

Figure 7:
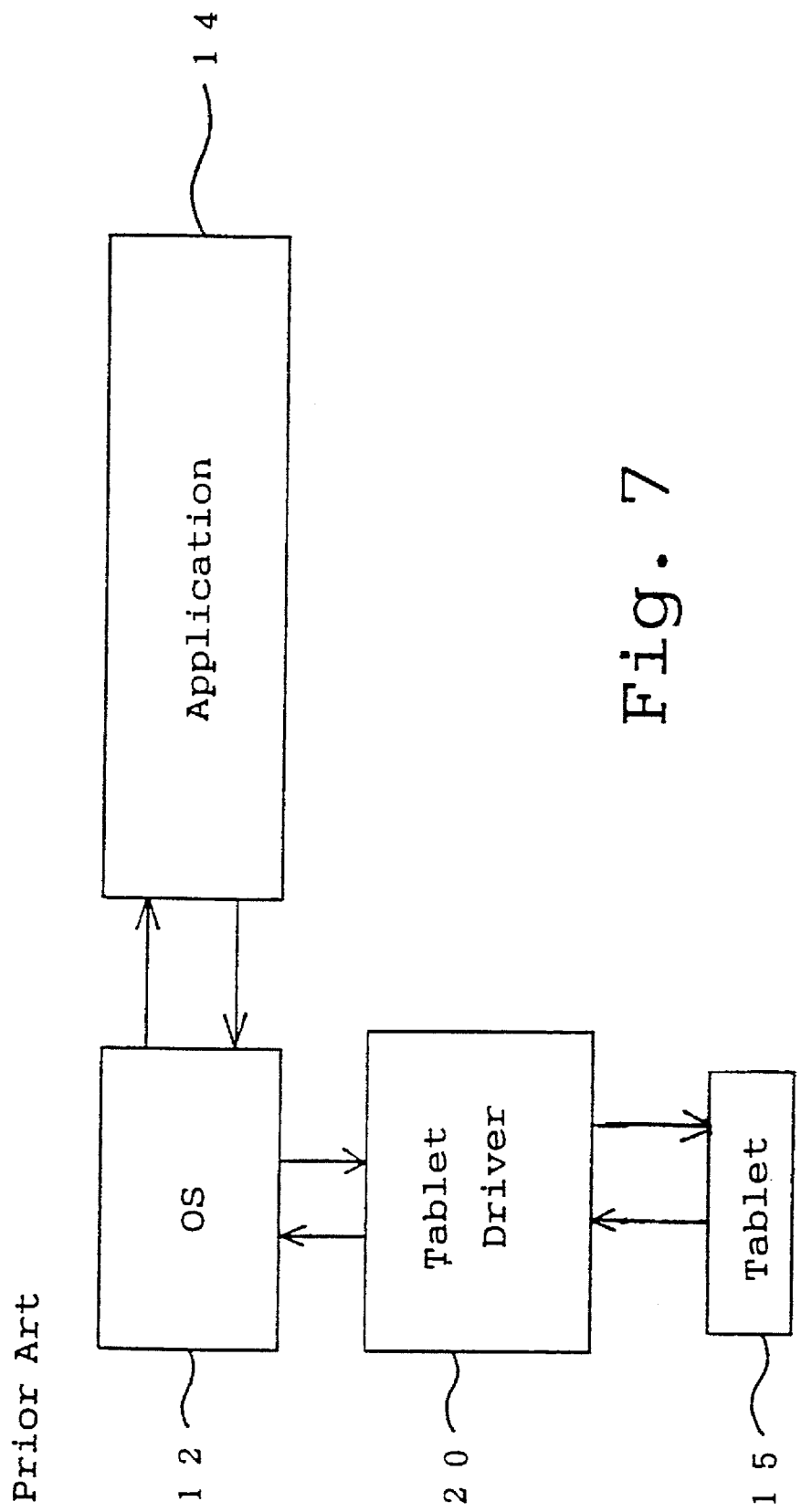
FIG. 7 is a flow chart of data processing system for processing mouse information in the conventional application program shown in FIG. 6.

FIG. 7 shows a flow chart of data processing system for processing mouse information in the conventional application program shown in FIG. 6. This conventional system employs a single tablet having a pointing device, and thus the tablet driver 20 converts the tablet information and the mouse information between the tablet 15 and the operating system 12, and the converted information is sent and received between the tablet driver 20 and the application 14 via the operating system 12.

Figure 8:
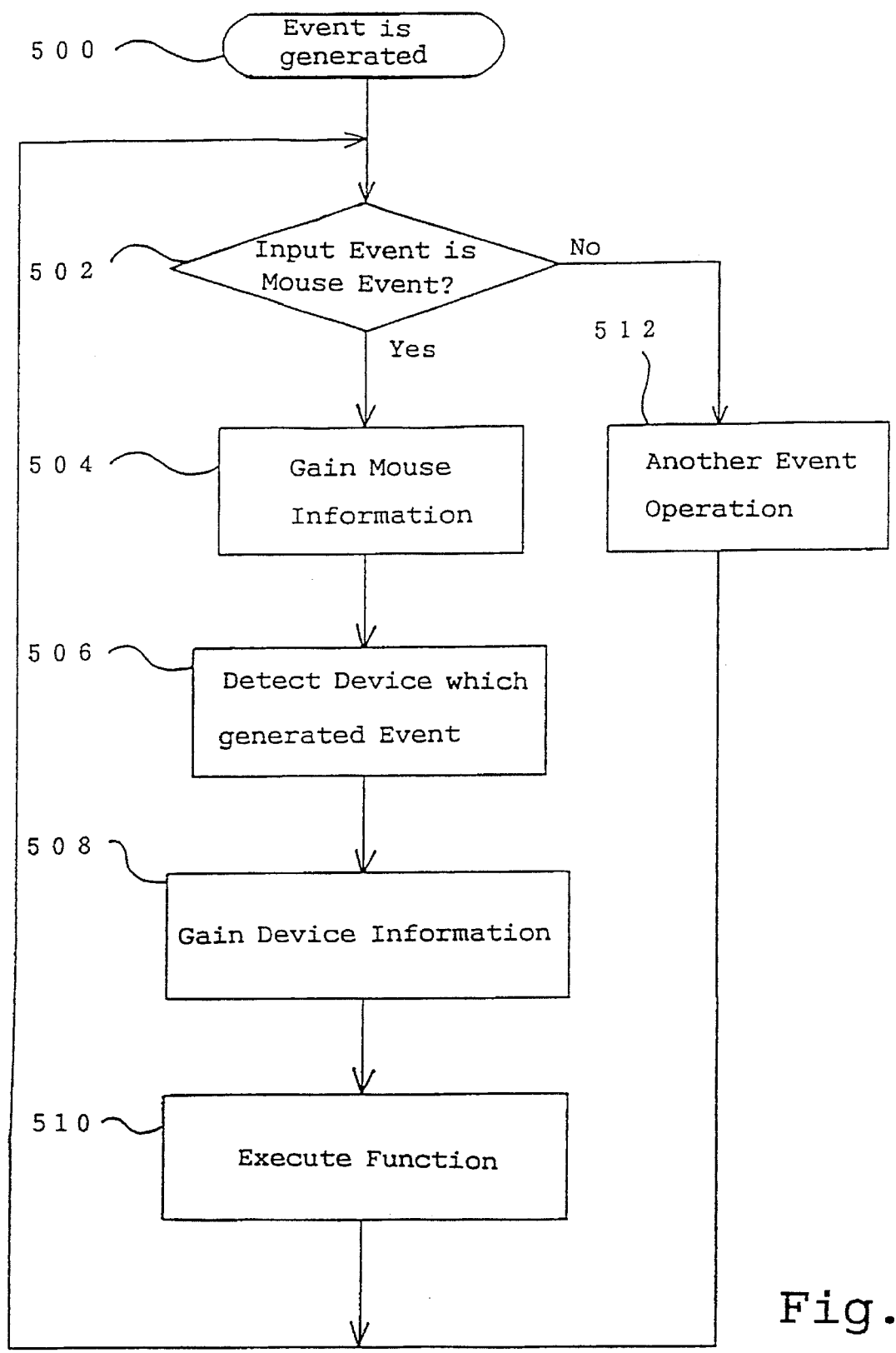
FIG. 8 is a flow chart which shows one example of data processing program for processing a mouse event by an application program according to the present invention.

FIG. 8 shows one example of a flow chart of data processing program for processing the mouse event by the application program according to the present invention. This program is executed to detect which pointing device generated the event signal and refer to the device information table with respect to the detected pointing device, and finally to gain the content of its information. In detail, at a decision block 502, this application program is executed to decide whether the input event is a mouse event or not. If answer is Yes, then the program is executed to gain the mouse information at a block 504. Nextly, at a block 506, the program is executed to detect which tablet (or pointing device when each tablet has two or more pointing devices) generated the event signal. At this block 506, the detection is performed by utilizing the flag 70 shown in FIG. 2. The information related to the detected tablet or pointing device is referred from the device information table shown in FIG. 2 or FIG. 3, and from the stroke information shown in FIG. 3. After the device information is gained, the program progresses to a block 510 where the aimed function is executed. After the execution the program is returned to the decision block 502 to repeat this program routine. If the answer of the decision block 502 is No, then the program progresses to a block 512 where the operation for another event is executed.

Figure 9:
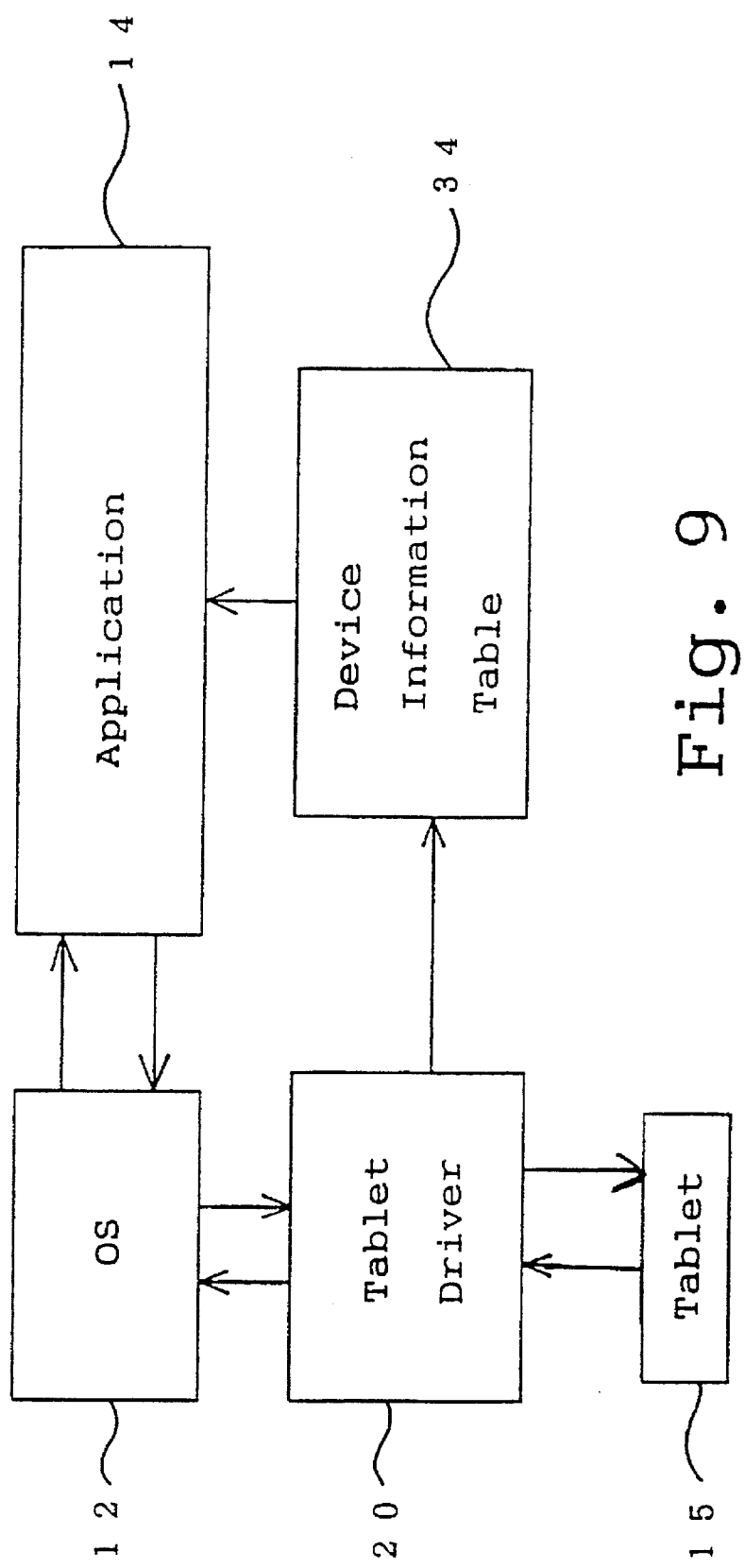
FIG. 9 is a flow chart of data processing system for processing mouse information in the application program shown in FIG. 8.

FIG. 9 shows a flow chart of data processing system for processing mouse information in the application program shown in FIG. 8. The tablet driver 20 converts the tablet information and the mouse information, and has a function to detect which tablet or pointing device 15 generated the event signal and transfer the device information to the application program.

As shown in FIG. 8, since the processing program to detect which tablet or pointing device generated the event signal in response to the mouse event and gain the device information by referring to the device information table relating to the detected tablet or pointing device depends on user operation, this processing manner is effectively and broadly applied to various operations.

The present invention is not limited to this manner shown in FIG. 8 and FIG. 9. For example, another processing program to transfer the device information and the stroke information to the associated application program can be also provided as shown in FIG. 10.

Figure 10:
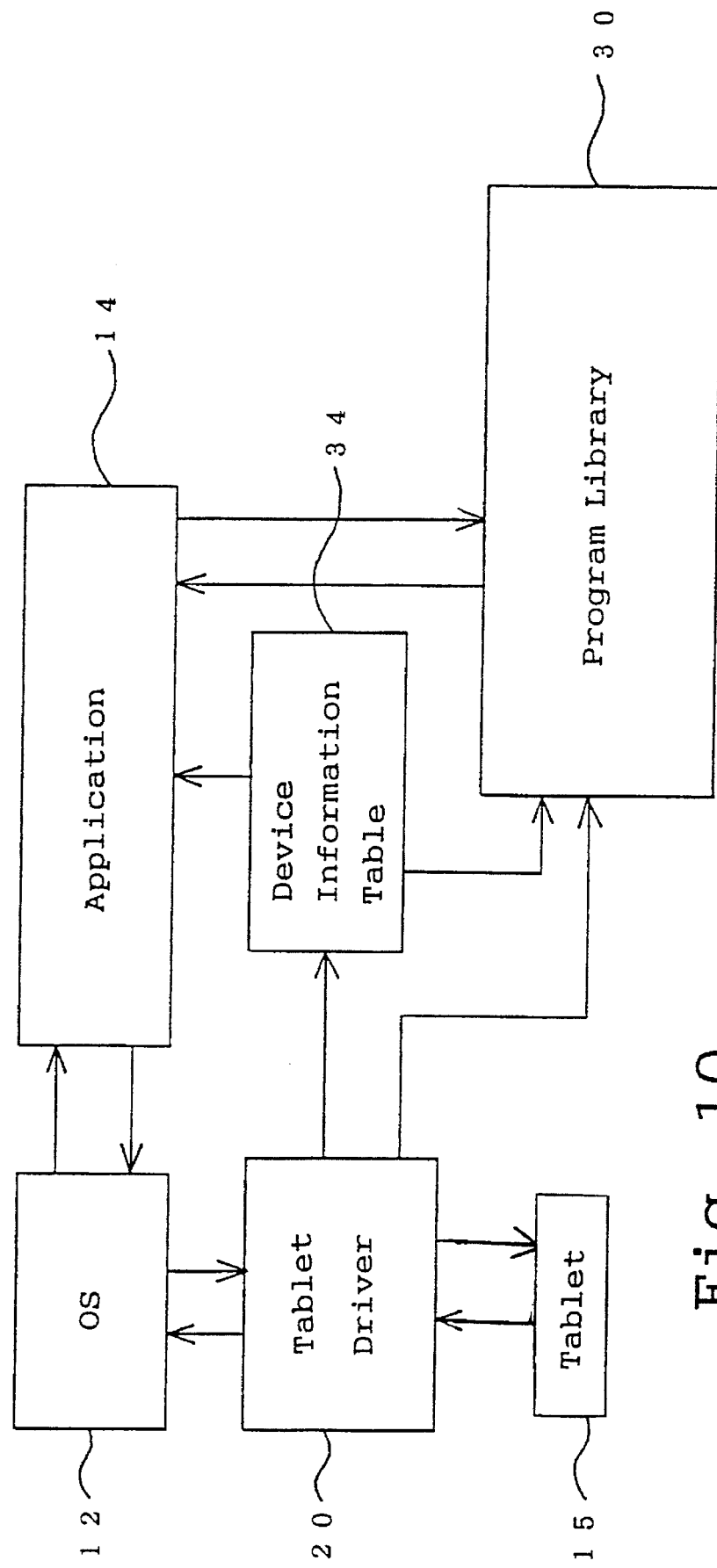
FIG. 10 is a flow chart of data processing system which shows another example to transfer device information to the associated application program.

In FIG. 10, the application program 14 has previously gained the address for the device information table; i.e., the table pointer. This previous operation is executed through the program library 30 which controls the multi-devices and their device information 34. In response to an event signal, the application program 14 executes to directly refer to the device information table by using the previously gained information. Alternatively, the application program may execute to inquire through any library function as necessary and refer to the device information in detail. This library function can be previously set in the program library for the use of this application program.

Figure 11:
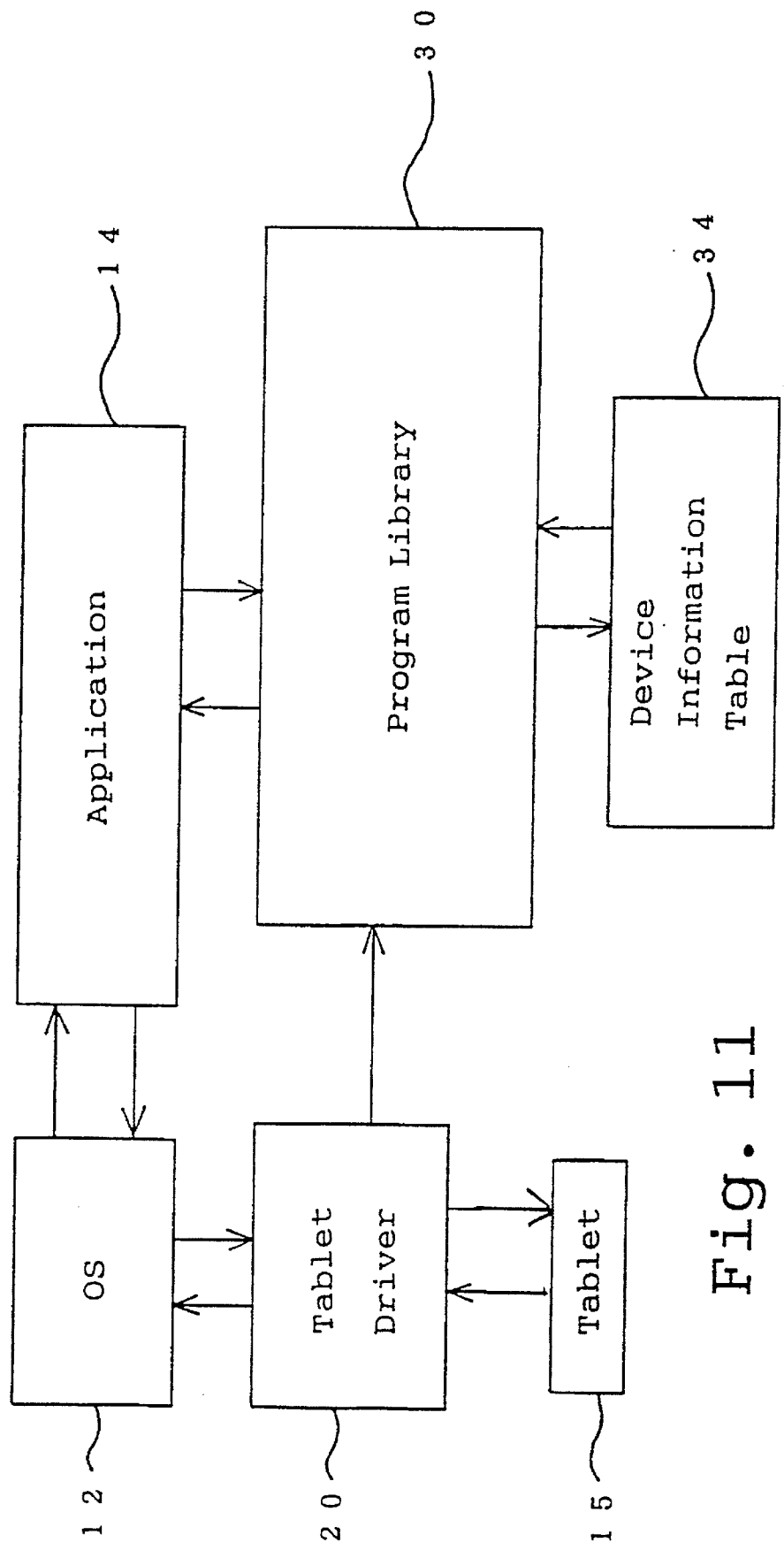
FIG. 11 is a flow chart of data processing system which shows still another example to transfer device information to the associated application program.

FIG. 11 is a flow chart of data processing system which shows still another example to transfer device information to the associated application program. In this example, the device information table 34 is controlled by the program library 30, and this application program 14 is ordinarily executed in response to mouse information. The application program 14 can gain the device information through the program library 30 by specifying the predetermined pointing device in a synchronism with the generation of event as required. For example, one of switches mounted on the pointing devices is associated with one of key input operation to gain the device information in response to ON signal of the associated switch. This operation is independent of the mouse information.

According to the control method and device as described above, since they include individual device information tables to store and control both stationary and kinetic information on plural pointing devices or tablets, and additional individual tables to store and manage record information as required, the application associated with this operating system can selectively operate the plural pointing devices or tablets by changing the processing procedure to refer to these individual device information tables in accordance with the occurrence of various conditions.

The present invention provides an improved control method allowing a plurality of pointing devices to be utilized in commonly used operating and application systems which have been inherently designed to be equipped with a single pointing device. Therefore, this control method contributes to development for various applications adapted for multi-devices. In other words, this control method provides one possibility relating to a new category in the development of application program to remarkably expand the utility of application programs in computer system.

As many apparently widely different embodiments of this invention may be made without departing from the spirit and scope thereof, it is to be understood that the invention is not limited to the specific embodiments thereof as defined in the appended claims.

What is claimed is:

1. In a data processing system including a hardware and its operating system which process only information input through a single pointing device, a control method for utilizing a plurality of pointing devices comprising;

a first storing step for storing stationary information, independent of time, on each one of the plural pointing devices and individual device information on each one of the pointing devices, containing current sampling data which is rewritten depending on every sampling operation of the pointing device, as the individual item corresponding to the pointing device in an individual device information table;

a second storing step for storing a table pointer to identify the stored position of the individual device information on each one of the pointing devices in the individual device information table;

a third storing step for storing the whole number of pointing devices and device status information representing current state of each one of the pointing devices;

a retrieval step for retrieving the required device information table by using the device status information and the table pointer, in response to event generated in any one of the plural pointing devices, or any request from the application, or at every predetermined period;

a control step for controlling the device information table to refer the content of the required device information table;

an ordinary data transmit step for sequentially transmitting sampling information representing coordinates and so on supplied from one of the plural pointing devices, as a mouse information to the operating system in time sharing manner;

a selecting step for selecting one of the plural pointing devices in response to the event generated; and a final data transmit step for transmitting only information from the selected pointing device as the currently required mouse information to the operating system.

2. In a data processing system including a hardware and its operating system which process only information input through a single pointing device, a control method for utilizing a plurality of pointing devices comprising;

a first storing step for storing stationary information, independent of time, on each one of the plural pointing devices and individual device information on each one of the pointing devices, containing current sampling data which is rewritten depending on every sampling operation of the pointing device, as the individual item corresponding to the pointing device in an individual device information table;

a second storing step for storing a table pointer to identify the stored position of the individual device information on each one of the pointing devices in the individual device information table;

a third storing step for storing the whole number of pointing devices and device status information representing current state of each one of the pointing devices;

a retrieval step for retrieving the required device information table by using the device status information and the table pointer, in response to event generated in any one of the plural pointing devices, or any request from the application, or at every predetermined period;

a control step for controlling the device information table to refer the content of the required device information table;

an ordinary data transmit step for sequentially transmitting sampling information representing coordinates and so on supplied from one of the plural pointing devices, as a mouse information to the operating system in time sharing manner;

a selecting step for selecting one of the plural pointing devices in response to the event generated a final data transmit step for transmitting only information from the selected pointing device as the currently required mouse information to the operating system;

an additional table forming step for forming a stroke record information table in which the record of stroke information currently generated and previously generated for a predetermined numbers, one stroke information being represented by a set of sampling data sequence during ON-keeping state of a switch associated with the pointing device which has one or more switches, when at least one of the plural pointing devices is mounted on the tablet;

a fourth storing step for storing a current stroke data pointer which indicates the stored position of the first data of the current stroke information stored as the above mentioned record of stroke information, and the number of sampling data included in each current stroke information; and a retrieval and reference step for retrieving and referring to the above mentioned stroke record information table as required.

3. The control method in the data processing system according to claim 1, wherein the switch assembled on the pointing device is associated with a keyboard input, and thus an ON-signal from the keyboard input associated switch is transmitted, independent of the data transmitting operation for transmitting the mouse information from the plural pointing devices, to the above operating system.

4. In a data processing system including a hardware and its operating system which process only information input through a single tablet, a control method for utilizing a plurality of tablets comprising;

a first storing step for storing stationary information, independent of time, on each one of the plural tablets and individual device information on each one of the tablets, containing current sampling data which is rewritten depending on every sampling operation of the pointing device, as the individual item corresponding to the tablet in an individual device information table;

a second storing step for storing a table pointer to identify the stored position of the individual device information on each one of the tablets in the individual device information table;

a third storing step for storing the whole number of tablets and device status information representing current state of each one of the tablets;

a retrieval step for retrieving the required device information table by using the device status information and the table pointer, in response to event generated in any one of the plural tablets, or any request from the application, or at every predetermined period;

a control step for controlling the device information table to refer the content of the required device information table;

an ordinary data transmit step for sequentially transmitting sampling information representing coordinates and so on supplied from one of the plural tablets, as a mouse information to the operating system in time sharing manner;

a selecting step for selecting one of the plural tablets in response to the event generated; and a final data transmit step for transmitting only information from the selected tablet as the currently required mouse information to the operating system.

5. A tablet interfacing method for converting coordinate information and switching information from plural tablets each of which has at least one of pointing device into any suitable forms adapted for an operating system, and supplying the converted information to this operating system, the method comprising;

a conversion-table forming step for forming a conversion-table which is converted whenever the switch information from each of the whole switches assembled on the plural tablets is associated with a mouse event or keyboard input;

a decision step for deciding whether the switch information on each one of the whole switches of the plural tablets is ON or OFF; and a transmit step for transmitting sequentially the coordinate data from each one of the plural tablets to the operating system in a time sharing manner when all of the switch information are OFF, or the converted information through the conversion-table as the information from the mouse event or the keyboard input to the operating system when any one of the switch information is ON.

6. In a data processing system including a hardware and its operating system which process only information input through a single pointing device, a control device for utilizing a plurality of pointing devices comprising;

a first storing means for storing stationary information, independent of time, on each one of the plural pointing devices and individual device information on each one of the pointing devices, containing current sampling data which is rewritten depending on every sampling operation of the pointing device, as the individual item corresponding to the pointing device in an individual device information table;

a second storing means for storing a table pointer to identify the stored position of the individual device information on each one of the pointing devices in the individual device information table;

a third storing means for storing the whole number of pointing devices and device status information representing current state of each one of the pointing devices;

a retrieval means for retrieving the required device information table by using the device status information and the table pointer, in response to event generated in any one of the plural pointing devices, or any request from the application, or at every predetermined period;

a control means for controlling the device information table to refer the content of the required device information table; an ordinary data transmitting means for sequentially transmitting sampling information representing coordinates and so on supplied from one of the plural pointing devices, as a mouse information to the operating system in time sharing manner;

a selecting means for selecting one of the plural pointing devices in response to the event generated; and a final data transmitting means for transmitting only information from the selected pointing device as the currently required mouse information to the operating system.

7. In a data processing system including a hardware and its operating system which process only information input through a single pointing device, a control device for utilizing a plurality of pointing devices comprising;

a first storing means for storing stationary information, independent of time, on each one of the plural pointing devices and individual device information on each one of the pointing devices, containing current sampling data which is rewritten depending on every sampling operation of the pointing device, as the individual item corresponding to the pointing device in an individual device information table;

a second storing means for storing a table pointer to identify the stored position of the individual device information on each one of the pointing devices in the individual device information table;

a third storing means for storing the whole number of pointing devices and device status information representing current state of each one of the pointing devices;

a retrieval means for retrieving the required device information table by using the device status information and the table pointer, in response to event generated in any one of the plural pointing devices, or any request from the application, or at every predetermined period;

a control means for controlling the device information table to refer the content of the required device information table;

an ordinary data transmitting means for sequentially transmitting sampling information representing coordinates and so on supplied from one of the plural pointing devices, as a mouse information to the operating system in time sharing manner;

a selecting means for selecting one of the plural pointing devices in response to the event generated;

a final data transmitting means for transmitting only information from the selected pointing device as the currently required mouse information to the operating system;

an additional table forming means for forming a stroke record information table in which the record of stroke information currently generated and previously generated for a predetermined numbers, one stroke information being represented by a set of sampling data sequence during ON-keeping state of a switch associated with the pointing device which has one or more switches, when at least one of the plural pointing devices is mounted on the tablet;

a fourth storing means for storing a current stroke data pointer which indicates the stored position of the first data of the current stroke information stored as the above mentioned record of stroke information, and the number of sampling data included in each current stroke information; and a retrieval and reference means for retrieving and referring to the above mentioned stroke record information table as required.

8. The control device in the data processing system according to claim 6, wherein the switch assembled on the pointing device is associated with a keyboard input, and thus an ON-signal from the keyboard input associated switch is transmitted, independent of the data transmitting operation for transmitting the mouse information from the plural pointing devices, to the above operating system.

9. In a data processing system including a hardware and its operating system which process only information input through a single tablet, a control device for utilizing a plurality of tablets comprising;

a first storing means for storing stationary information, independent of time, on each one of the plural tablets and individual device information on each one of the tablets, containing current sampling data which is rewritten depending on every sampling operation of the tablet, as the individual item corresponding to the tablet in an individual device information table;

a second storing means for storing a table pointer to identify the stored position of the individual device information on each one of the tablets in the individual device information table;

a third storing means for storing the whole number of tablets and device status information representing current state of each one of the tablets;

a retrieval means for retrieving the required device information table by using the device status information and the table pointer, in response to event generated in any one of the plural tablets, or any request from the application, or at every predetermined period;

a control means for controlling the device information table to refer the content of the required device information table;

an ordinary data transmitting means for sequentially transmitting sampling information representing coordinates and so on supplied from one of the plural tablets, as a mouse information to the operating system in time sharing manner;

a selecting means for selecting one of the plural tablets in response to the event generated; and a final data transmitting means for transmitting only information from the selected tablet as the currently required mouse information to the operating system.

10. A tablet interfacing device for converting coordinate information and switching information from plural tablets each of which has at least one of pointing device into any suitable forms adapted for an operating system, and supplying the converted information to this operating system, the device comprising;

a conversion-table forming means for forming a conversion-table which is converted whenever the switch information from each of the whole switches assembled on the plural tablets is associated with a mouse event or keyboard input;

a decision means for deciding whether the switch information on each one of the whole switches of the plural tablets is ON or OFF; and a transmit means for transmitting sequentially the coordinate data from each one of the plural tablets to the operating system in a time sharing manner when all of the switch information are OFF, or the converted information through the conversion-table as the information from the mouse event or the keyboard input to the operating system when any one of the switch information is ON.

* * * * *